July 19, 1955     C. H. NEER     2,713,269
FLUID SAMPLING AND TESTING EQUIPMENT
Filed June 8, 1954     4 Sheets-Sheet 1
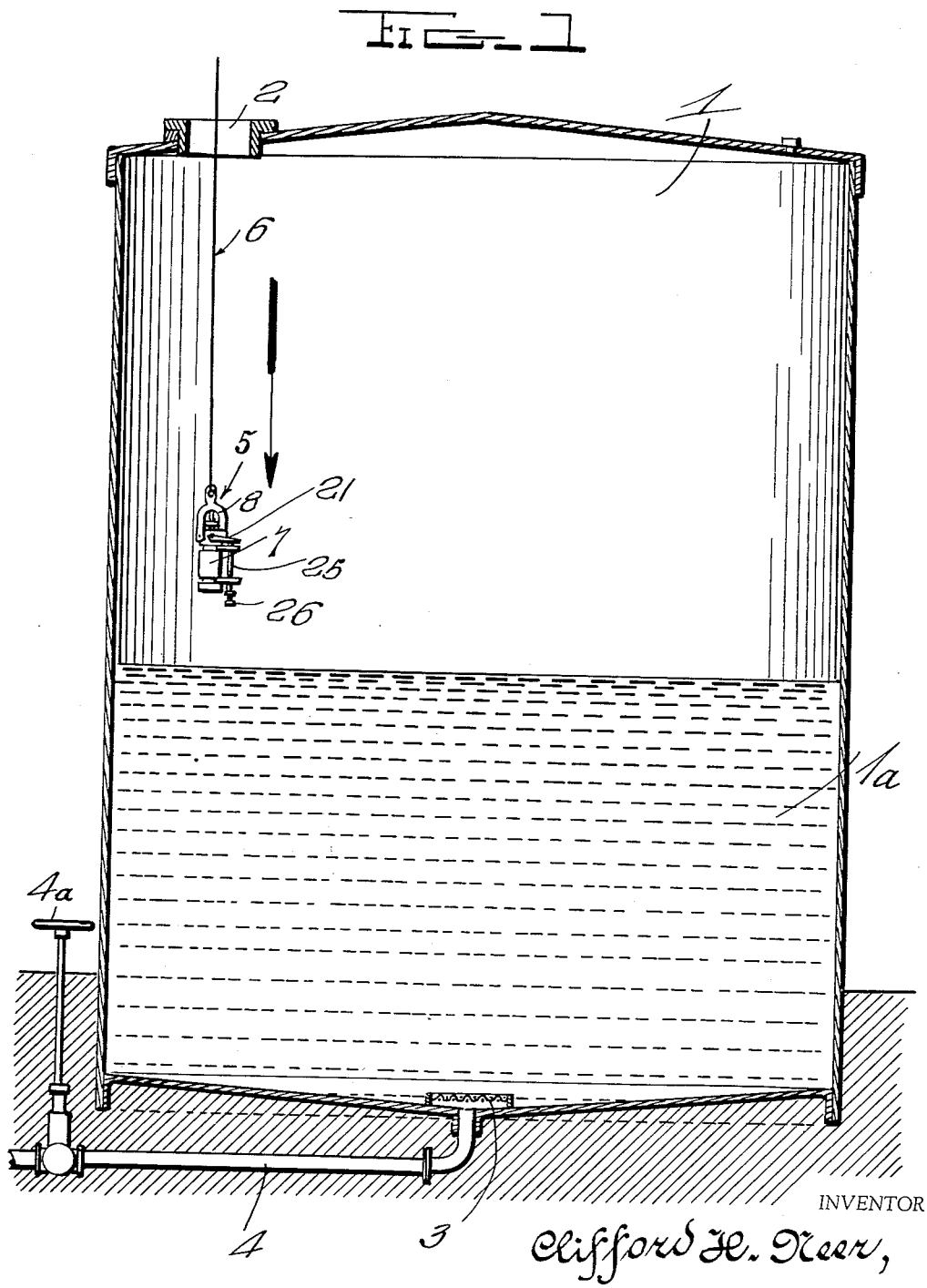
INVENTOR
Clifford H. Neer,
BY John B. Brady
ATTORNEY July 19, 1955
C. H. NEER
2,713,269
FLUID SAMPLING AND TESTING EQUIPMENT
Filed June 8, 1954
4 Sheets-Sheet 2
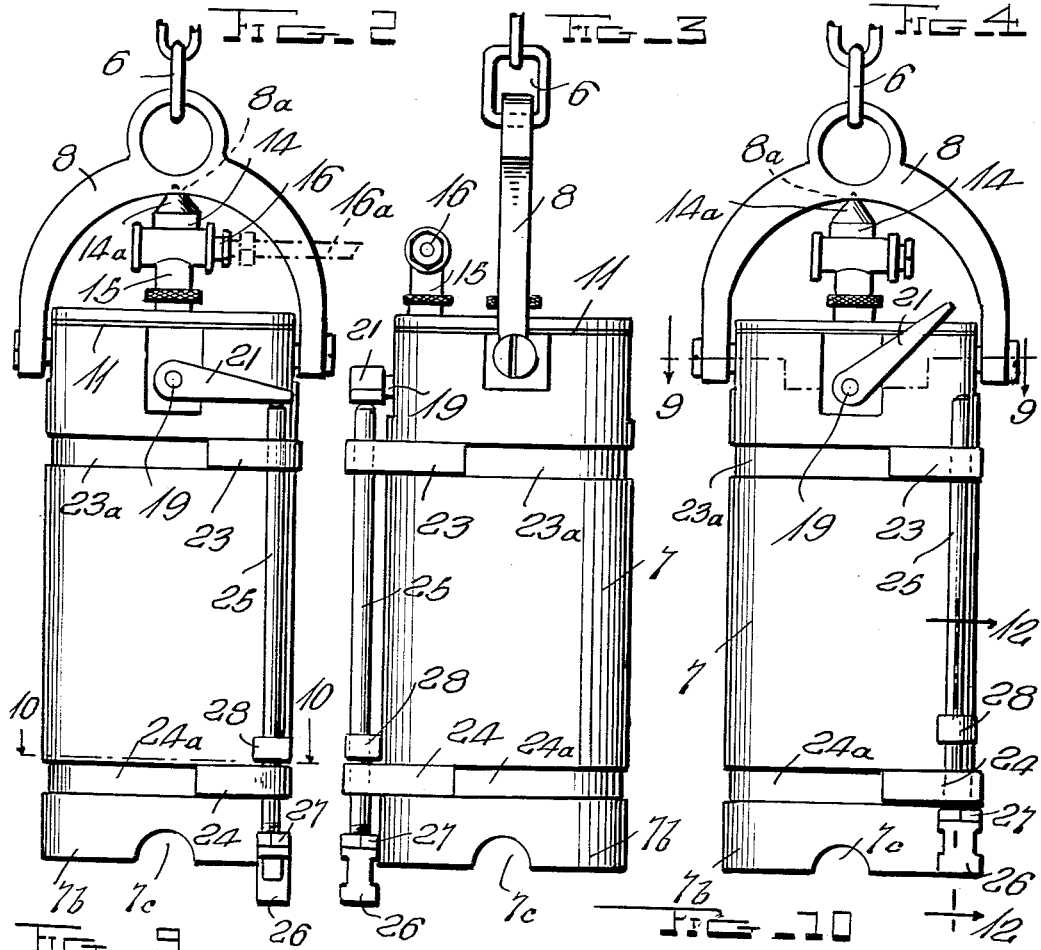
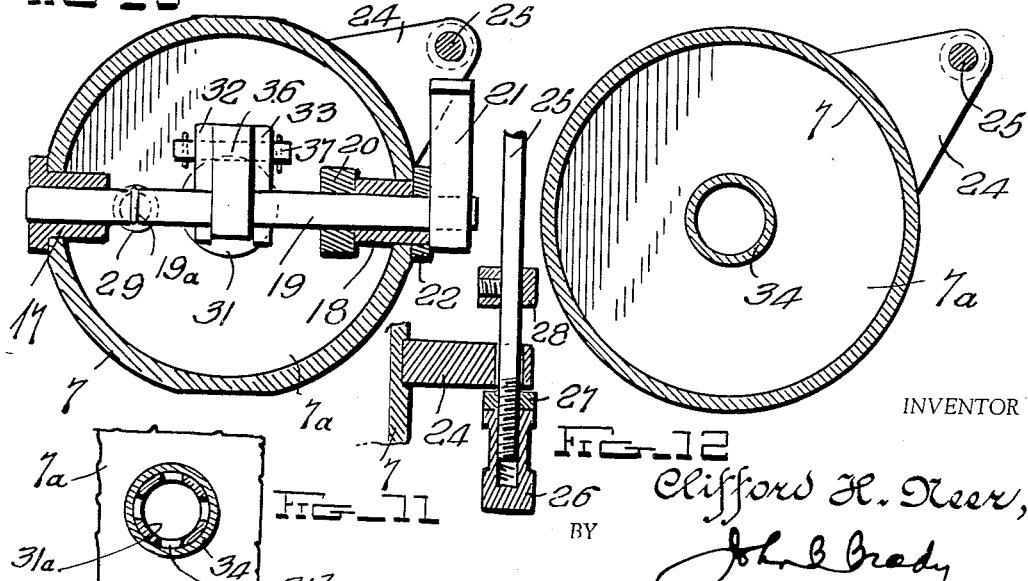
INVENTOR
Clifford H. Neer,
BY
John B. Brady
ATTORNEY

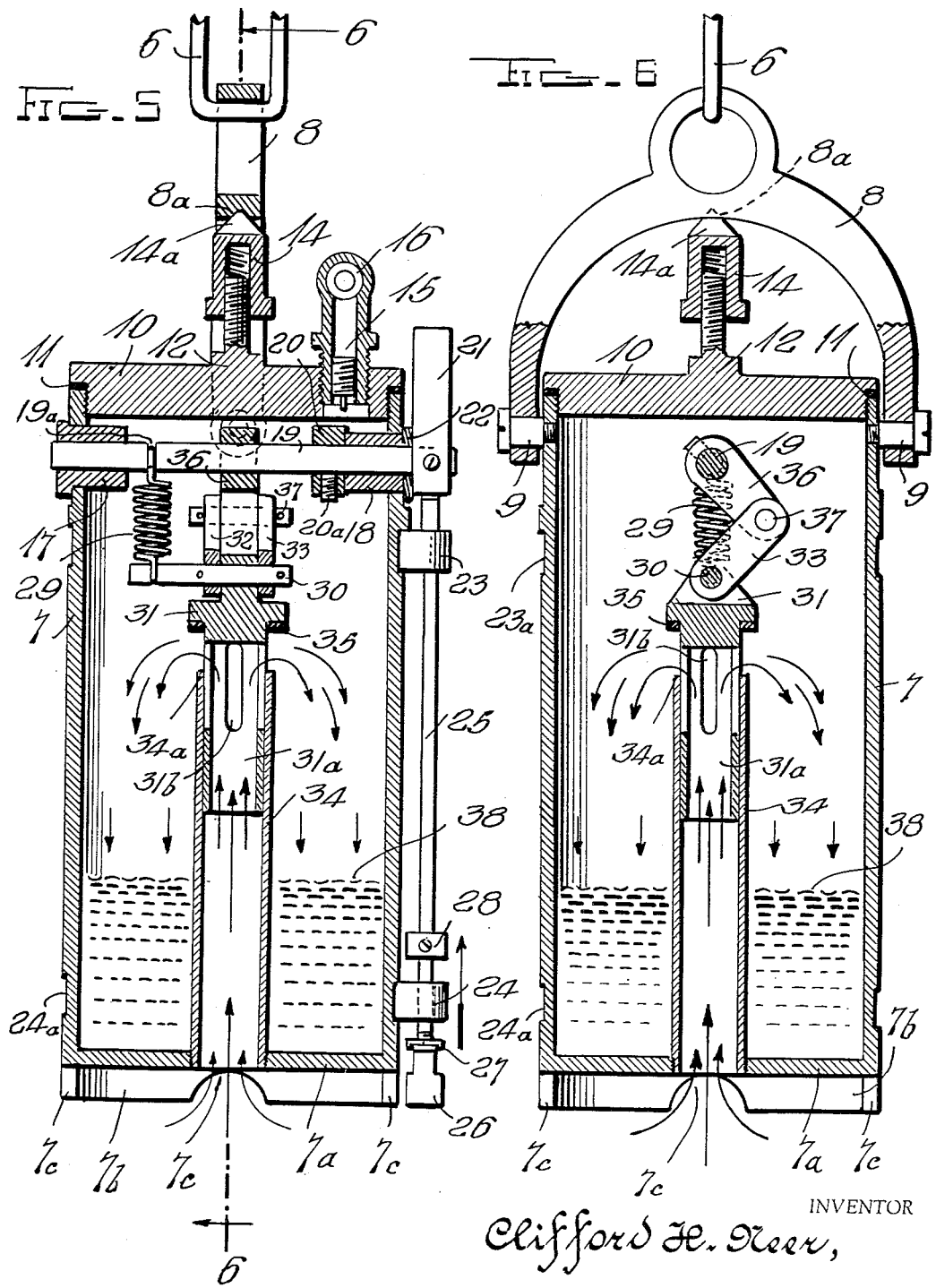

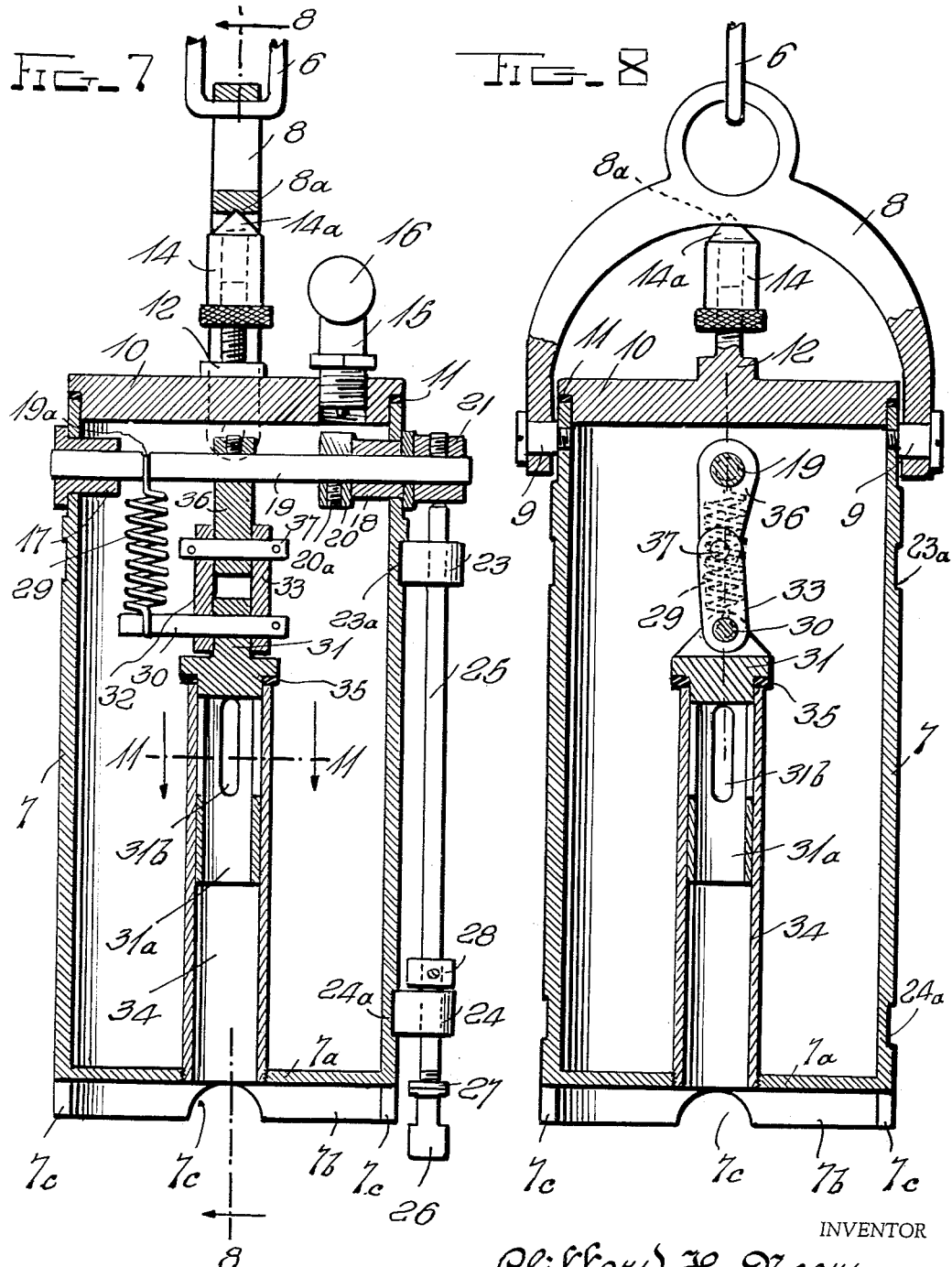

United States Patent Office 2,713,269
Patented July 19, 1955

2,713,269

FLUID SAMPLING AND TESTING EQUIPMENT

Clifford H. Neer, Pikesville, Md., assignor to Maryland Engineering Company, Pikesville, Md., a copartnership consisting of William F. McBride and Ruth D. S. McBride Application June 8, 1954, Serial No. 435,152

6 Claims. (Cl. 73—425.4)

My invention relates broadly to a method and apparatus for sampling the contents of fluid storage tanks and more particularly to tank content-sampling and testing equipment and the method of operation thereof for facilitating the analysis of the condition of fluid in storage tanks.

One of the objects of my invention is to provide a method of collecting fluid samples from fluid storage tanks in congested spaces and where access to the stored fluid is not conveniently accessible except through the fluid inlet connection to the storage tank.

Another object of my invention is to provide a construction of tank content-sampling device by which the condition of fluid in a storage tank may be analyzed and determined.

Still another object of my invention is to provide a construction of sampling device for fluid where the sampling device may be lowered into a storage tank and submerged in the fluid stored therein and a sample of the fluid content collected adjacent the bottom of the tank and withdrawn for analysis.

A further object of my invention is to provide a construction of fluid sampling tank which may be evacuated and then introduced into an oil storage tank and the vacuum broken therein by physical displacement of a vacuum valve by contact with the bottom of the tank into which the sampling device is lowered for transmitting a sample of the fluid into the sampling device for withdrawal and testing.

A still further object of my invention is to provide a construction of fluid sampling device adapted to be initially evacuated preparatory to the submergence thereof in a fluid storage tank where the device includes a valve mechanism initially closed preparatory to the evacuation of the device and adapted to be actuated upon gravitational contact with the bottom of the fluid storage tank, enabling a sample of fluid to be sucked into the device and maintained therein while the device is withdrawn from the fluid storage tank for delivery of the sample of fluid to a testing laboratory for analysis and determination of the condition of the fluid.

Still another object of my invention is to provide a construction of valve actuating mechanism operative by contact with the bottom of a fluid storage tank for actuating a valve which permits the sucking-in of a specimen of fluid from the fluid storage tank and which may be withdrawn for laboratory testing and analysis.

Other and further objects of my invention reside in a method and apparatus for testing the condition of fluid in fluid storage tanks as set forth more fully in the specification hereinafter following by reference to the accompanying drawings, in which:

Fig. 1 is a vertical sectional view through a fluid storage tank and illustrating and sampling device of my invention, being lowered therein for collecting a specimen of the fluid content for analysis;

Fig. 2 is a front elevational view of the fluid sampling device of my invention, the view illustrating the fluid sampling device while it is suspended above contacting position with the bottom of the tank, with the valve mechanism shown in position prior to triggering;

Fig. 3 is a side elevational view of the fluid sampling device shown in Fig. 2;

Fig. 4 is a view similar to the views of the device illustrated in Figs. 2 and 3 but showing the position of the valve actuator when the sampling device is lowered into contact with the bottom of the tank and the valve mechanism triggered for opening the container for the in-rush of fluid;

Fig. 5 is a vertical sectional view through the fluid sampling device and showing particularly the method of automatically filling the evacuated tank of the fluid sampling device;

Fig. 6 is a vertical sectional view through the sampling tank taken on line 6—6 of Fig. 5;

Fig. 7 is a vertical sectional view taken through the sampling device while the device is suspended and before the valve actuator abuts with the bottom of the tank from which a sample of fluid is to be abstracted;

Fig. 8 is a vertical sectional view through the fluid sampling device on line 8—8 of Fig. 7;

Fig. 9 is a horizontal sectional view taken substantially on line 9—9 of Fig. 4, oriented in position 90°;

Fig. 10 is a transverse sectional view taken substantially on line 10—10 of Fig. 2, oriented in position approximately 90°;

Fig. 11 is a horizontal sectional view taken on line 11—11 of Fig. 7; and

Fig. 12 is a fragmentary vertical sectional view taken through the lowermost portion of the valve actuator on line 12—12 of Fig. 4.

My invention is directed to an apparatus which may be lowered into a relatively inaccessible area for collecting a fluid sample for withdrawal of the sample for testing and analysis as to the contents thereof. My invention has been illustrated as particularly applicable to the collecting of oil specimens from enclosed oil tanks where the collection of sediment over the years tends to impair the quality of the oil. The determination of the characteristics of the oil in the tank will give an indication of the necessity of shutting down the tank for cleaning and repair.

Although I have illustrated the invention particularly applicable to the determination of the condition of oil I desire that it be understood that there are no limitations with respect to the field of application of my invention. Because of the method of remotely gathering the specimens by use of my invention, the method herein disclosed may be employed in the collection of fluids generally in a determination, for example, of radio activity of fluids while maintaining substantial distance between the collected specimen and the investigator. Accordingly, throughout this specification I shall refer to "oil," but I intend to indicate thereby any fluid and desire that the term "oil" be considered in an illustrative sense and not in a limiting sense.

In carrying out my invention I provide a container having a vacuum-tight closure and an automatic valve thereon adapted to be controlled by a valve actuator operative by abutment with the bottom of the tank as the container is gravitationally lowered into the tank. The container is initially evacuated by pumping out the air from the interior of the container, and the container, with the valve mechanism thereon in closed position, gravitationally lowered into the tank in a position in which a specimen may be collected along the bottom of the tank. As the container moves to a limiting position on the bottom of the tank the valve actuator abuts with the bottom of the tank and opens the container valve. The vacuum within the container causes an in-rush of oil from the tank for collecting in the container a specimen of the oil which may be withdrawn from the tank and subsequently tested and analyzed.

The valve mechanism is triggered and operates by a spring controlled snap-action for opening the valve upon abutment of the valve actuator with the bottom of the tank. After withdrawal of the container, and the extraction of the specimen therefrom for analysis and testing, the valve actuating mechanism is re-set preparatory to a repeat operation when the container is again lowered into the oil tank on an exploratory mission.

Referring to the drawings in detail reference character 1 designates a fluid storage tank having an intake 2 at the top thereof and a drain 3 at the bottom, connected through a drain pipe 4 controlled by a cut-off 4a. The fluid sampling equipment is illustrated generally at 5 attached to the lower end of a cable 6 by which the equipment may be gravitationally lowered through the relatively small intake port 2 into the fluid 1a in the storage tank 1. The fluid sampling equipment includes the cylindrical container 7 which may be formed from metal or plastic. A plastic container is employed where the testing apparatus is used for sampling a fluid which may detrimentally attack metal such as in the case of acid solutions. The cylindrical container 7 is vertically suspended by a yoke 8 interconnecting the tank 7 and the lower end of cable 6. Trunnions 9 interconnect the lower ends of yoke 8 with the upper end of cylindrical tank 7. A conically-shaped recess 8a is formed in a central position in the underside of yoke 8. The cylindrical container 7 is provided with a circular top 10 which fits thereon with the aid of a sealing gasket 11 for establishing a vacuum-tight seal. The circular top 10 carries a central vertically extending screw-threaded stud 12 which receives the adjustable cylindrical thimble 14 having a conically-shaped terminus 14a which is adapted to enter and establish a wedging connection with the conically-shaped recess 8a in yoke 8 when the adjustable thimble 14 is screwed upwardly on screw-threaded stud 12 for forcing the top 10 into sealing relationship with the upper end of the container 7.

The top 10 of the container carries a valve 15 which is screw-threaded therein and provides a connection 16 for connecting the hose of a hand pump. The hose is indicated in dotted lines in Fig. 2 at 16a. The upper end of container 7 is provided with laterally extending sleeve bearings 17 and 18 projecting through diametrically opposite sides thereof and forming a vacuum-tight fit with the walls of the container 7 and serving as journals for the laterally extending shaft 19. The shaft 19 projects beyond one side of the container and is maintained in lateral position by means of a collar 20 which is adjustably positioned on shaft 19 by means of set screw 28. The projecting end of shaft 19 is provided with a lever 21 which is angularly rockable within the limits of an acute angle. The position of the lever 21 is shown in one such limit in Fig. 2, and in the other limit in Fig. 4. A spacer 22 is provided on shaft 19 between one end of the sleeve bearing 18 and the lever 21.

The exterior of the cylindrical container is provided with grooves 23a and 24a into which brackets 23 and 24 extend and are welded to the side of the container. These brackets 23 and 24 are apertured for the passage of an actuating rod 25 which is lineally movable into a vertical direction thereto. The movement of actuating rod 25 is restricted on one end by the adjustable nut 27 which engages the screw-threaded end of actuating rod 25 and the adjustable end abutment 26 which also engages the screw-threaded end of actuating rod 25. The adjustment nut 27 constitutes a lock nut for maintaining the end abutment 26 in a selected adjusted position. The movement of the actuating rod 25 in the upward direction is restricted by means of adjustable collar 28 which is selectively set on actuating rod 25. The upper extremity of actuating rod 26 abuts against the projecting end of lever 21 as shown more clearly in Fig. 2.

Shaft 19 is annularly grooved at 19a and serves to suspend the upper end of coil spring 29, the lower end of which is connected to the laterally extending pintle 30 which passes through the stem of the central valve member 31 and the two links shown at 32 and 33. The central valve member 31 includes a depending cylindrical portion 31a having vertically disposed slots 31b therein. The cylindrical portion 31a of the central valve member slides telescopically within the vertically disposed axially extending oil intake pipe 34, as shown more clearly in Figs. 5–8 and 10 and 11. The oil intake pipe 34 is mounted in the bottom wall 7a of the container 7 and terminates at its upper end in a circular discharge orifice. The bottom wall 7a is spaced from the extremity of the lower end of container 7 by means of the peripheral skirt portion of the container, represented at 7b in Figs. 2–8. The skirt portion 7b of the container is provided with openings 7c at quadrilaterally spaced positions through which oil may be sucked for entry through oil intake pipe 24. The oil intake openings 7c are particularly effective where the container may be gravitated against a layer of sludge in the bottom of the tank and where the spacing provided by the skirt 7b is sufficient to elevate the lower end of intake pipe 34 above the bottom of the tank to enable entry of the oil specimen through the oil intake openings 7c. The central portion 31a of the central valve member 31 is normally wholly housed within the upper end of the oil intake pipe 34 as represented in Figs. 7 and 8 with the gasket 35 seated against the upper peripheral edge of oil intake pipe 34 and the slots 31 closed by the walls of the oil intake pipe 34. This normally closed position of the container 7 is maintained by coaction of the central lever 36 which is adjustably set at the center of the top portion of the container and is connected at its lower extremity by means of pintle 37 with the links 32 and 33 as shown. In the closed positions with central valve member 31, illustrated in Figs. 2, 3, 7, 8 and 9, coil spring 39 serves to force central valve 3, member 31 into sealing relation with the upper end of oil intake pipe 34 with central lever 36 substantially aligned with links 32 and 33 as illustrated more clearly in Figs. 7 and 8. In this position the external lever 21 on the end of shaft 19 projects substantially horizontal, as represented in Figs. 2, 3, 7 and 9, with the actuating rod 25 resting immediately below the end of external lever 21 as shown more clearly in Fig. 2. Under these circumstances the end abutment 26 on actuating rod 25 projects beyond the lower end of container 7 as shown more clearly in Figs. 2, 3 and 7. However, when container 7 is gravitationally lowered against the bottom of tank 1, the end abutment 26 strikes the bottom of tank 1 and actuating rod 25 exerts a force upwardly against the end of external lever 21, thereby moving central lever 36 to a position off-center with respect to the centrally aligned position represented in Figs. 7 and 8; whereupon coil spring 29, which is normally maintained in the expanded position, represented in Figs. 7 and 8, by the aligned position of central lever 36 and links 32 and 33, suddenly contracts to the position shown in Figs. 5 and 6, thus moving central lever 36 angularly and correspondingly moving links 32 and 33 shortening the distance between the centers of pintle 30 and shaft 19 and correspondingly raising central lever member 31 and elevating cylindrical portion 31a of central valve member 31 to a position in which slots 31b are raised from the covered position thereof within oil intake pipe 34 as shown in Figs. 7 and 8 to the uncovered position illustrated in Figs. 5 and 6.

When the testing apparatus is initially prepared a hand pump, having flexible connecting tube 16a, is connected at the pump connection 16 of the valve tap 15 in the top of container 7, and with the interior central valve member 31 in closed position, represented in Figs. 2, 3, 7, 8 and 9, the air in the interior of container 7 is pumped out and the container evacuated. For most successful results I establish a vacuum in container 7 of at least twenty inches. The container is now lowered into the fluid tank as represented in Fig. 1. When the end abutment 26 on valve actuating rod 25 strikes the bottom of the tank 1, external lever 21 is triggered off, thus throwing central lever 36 and the connected links 32 and 33 off-center and disturbing the balanced equilibrium of coil spring 29 resulting in the snap-action movement of the central valve member 31, from the position shown in Figs. 7 and 8 to the position shown in Figs. 5 and 6. The vacuum within container 7 is thus abruptly broken resulting in the in-rush of oil through oil intake opening 7c and upwardly through oil intake pipe 34 and through the uncovered slots 31b over the edge 34a of the upper end of oil intake pipe 34, as indicated by the arrows in Figs. 5 and 6.

The oil collects in a pool represented at 38 within the annular space between the interior wall of container 7 and the exterior surface of oil intake pipe 34. The central lever 36 and the links 32 and 33 form a toggle connection between laterally extending shaft 19 and central valve member 31 and insure rapid snap-action movement of the central valve member 31 immediately upon the displacement of the toggle from a position of balanced equilibrium. The oil intake pipe 34 is of sufficient height to permit the collection of an adequate quantity of fluid for testing purposes while preventing leakage of the test fluid into the main tank while the container is being raised from the main tank. Approximately one quart of test fluid may be collected in this manner. As soon as the container has been removed from the tank through the port 2 in the top thereof the contents of the container are poured into test vessel for analysis and determination of the characteristics of the fluid. Based on the analysis of such samples the condition of the tank 1 may be determined where a large percentage of sludge and dirt is discovered in the fluid, the tank must definitely be cleaned and possibly shut down for repair.

The method of this invention is employed in association with the tank cleaning apparatus of my copending application Serial Number 404,531, filed January 18, 1954, for Tank Cleaning Apparatus.

The principal feature of the method of my invention is the submerging of an evacuated receptacle below the surface of a stored fluid, the breaking of the vacuum in the receptacle by gravitational contact of the receptacle with the bottom of the fluid storage tank, thereby enabling a specimen of the fluid to be sucked into the receptacle for withdrawal from the storage tank.

To effectuate the tripping of the valve mechanism for breaking the vacuum within the receptacle, the receptacle must have sufficient mass to permit the gravitational shock thereof against the bottom of the storage tank to develop a sufficient impact blow as will displace the balanced equilibrium of the valve control mechanism for opening the valve preparatory to the in-rush of the fluid into the receptacle.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. Apparatus for sampling fluid from a main body of fluid confined in an enclosed ported tank comprising: a receptacle adapted to be pendently suspended and introduced into a ported tank, said receptacle being sealable and adapted to be evacuated and having a vertically movable actuating rod mounted on the exterior thereof, the lower end of said rod normally extending below the bottom periphery of said receptacle and adapted to be forced upwardly when said receptacle contacts the bottom of the tank, the upper end of said rod being movable adjacent the upper end of said receptacle, a laterally extending shaft journalled adjacent the upper end of said receptacle and projecting exteriorly beyond one side thereof, an actuating lever mounted externally on said shaft and projecting into the path of the upper end of said actuating rod whereby said lever is subjected to an angular rotative movement when the lower end of said actuating rod strikes the bottom of the tank, a fluid intake pipe mounted axially within said receptacle and terminating in a fluid discharge orifice, and valve mechanism interposed between said fluid discharge orifice and said shaft and controlled by the angular movement of said shaft, and means for evacuating the interior of said receptacle.

2. Apparatus for sampling fluid from a main body of fluid confined in an enclosed ported tank as set forth in claim 1 in which said valve mechanism includes a sealing valve operative with respect to said discharge orifice and a spring actuated toggle mechanism disposed between said shaft and said valve for effectuating the raising of said valve upon displacement of said actuating lever externally of said receptacle.

3. Apparatus for sampling fluid from a main body of fluid confined in an enclosed ported tank as set forth in claim 1 in which said valve mechanism includes a slotted sleeve telescopically slidable with respect to the upper end of said fluid intake pipe, said sleeve having a flange thereon with a sealing gasket adapted to establish sealing connection with the periphery of said discharge orifice and a spring actuated toggle mechanism interposed between said valve mechanism and said shaft and controlled by said actuating lever externally of said receptacle for effectuating the opening of said valve mechanism.

4. Apparatus for sampling fluid from a main body of fluid confined in an enclosed ported tank as set forth in claim 1 in which said receptacle terminates in a peripheral skirt having spaced apertures in the sides thereof and beneath the bottom of said receptacle whereby an area immediately adjacent the bottom of the tank may be sampled while the receptacle is rested thereon.

5. Apparatus for sampling fluid from a main body of fluid confined in an enclosed ported tank as set forth in claim 1 in which said actuating rod is lineally adjustable in the effective length thereof and is controlled for movement within limits for imparting a predetermined angular movement to said actuating lever when said receptacle abuts against the bottom of the tank.

6. Apparatus for sampling fluid from a main body of fluid confined in an enclosed ported tank as set forth in claim 1 in which said shaft carries a lever member positioned centrally of said receptacle and movable simultaneously with the movement of said actuating lever for controlling the opening of said valve mechanism.

References Cited in the file of this patent

UNITED STATES PATENTS

| | | |
|---|---|---|
| 2,274,869 | Pfeiffer | Mar. 3, 1942 |
| 2,374,227 | Metcalf | Apr. 24, 1945 |
| 2,411,157 | Fene et al. | Nov. 19, 1946 |